United States Patent
Nguyen et al.

(10) Patent No.: US 12,006,648 B2
(45) Date of Patent: Jun. 11, 2024

(54) METHOD FOR MANUFACTURING A GRAVITY BASED FOUNDATION FOR AN OFFSHORE INSTALLATION, AND GRAVITY BASED FOUNDATION

(71) Applicant: Koninklijke BAM Groep N.V., Bunnik (NL)

(72) Inventors: Nhut Quang Nguyen, Gouda (NL); Josephus Fredericus Maria van Rijen, Gouda (NL)

(73) Assignee: Koninklijke BAM Groep N.V., Bunnik (NL)

( * ) Notice: Subject to any disclaimer, the term of this patent is extended or adjusted under 35 U.S.C. 154(b) by 49 days.

(21) Appl. No.: 17/423,972

(22) PCT Filed: Jan. 21, 2020

(86) PCT No.: PCT/NL2020/050030
§ 371 (c)(1),
(2) Date: Jul. 19, 2021

(87) PCT Pub. No.: WO2020/153839
PCT Pub. Date: Jul. 30, 2020

(65) Prior Publication Data
US 2022/0090342 A1 Mar. 24, 2022

(30) Foreign Application Priority Data
Jan. 22, 2019 (NL) ...................................... 2022433

(51) Int. Cl.
*E02D 27/52* (2006.01)
*E02B 17/02* (2006.01)
(Continued)

(52) U.S. Cl.
CPC ............ *E02D 27/52* (2013.01); *E02B 17/025* (2013.01); *E02D 27/425* (2013.01); *F03D 13/25* (2016.05);
(Continued)

(58) Field of Classification Search
CPC ........... E02B 17/025; E02B 2017/0091; E02D 27/425; E02D 27/52; E02D 2250/0007; E02D 2250/0023; F03D 13/25
See application file for complete search history.

(56) References Cited

U.S. PATENT DOCUMENTS

| 8,661,752 B2 * | 3/2014 | Phuly ...................... E02D 27/42 52/296 |
| 2018/0119381 A1 | 5/2018 | Garcia et al. |

FOREIGN PATENT DOCUMENTS

| EP | 1 777 348 A1 | 4/2007 |
| EP | 2 559 814 A1 | 2/2013 |

(Continued)

OTHER PUBLICATIONS https://www.thefreedictionary.com/embedded; 2004.*

*Primary Examiner* — Sean D Andrish
(74) *Attorney, Agent, or Firm* — Hoffmann & Baron, LLP

(57) ABSTRACT

A gravity based foundation for an offshore installation includes a caisson of concrete and a hollow shaft. The caisson has a bottom slab, a roof and a side wall extending between the bottom slab and the roof. The roof having a passage for the shaft into the caisson. The shaft support has embedded tensioning bars vertically projecting from the upper side of the shaft support. The shaft is mounted on the shaft support by the tensioning bars. A method of manufacturing includes providing a concrete bottom slab, arranging a full-length formwork onto the bottom slab, arranging a slip formwork onto the bottom slab, providing the tensioning bars and mounting the tensioning bars in a fixed position to (Continued)

the full-length formwork, and concrete pouring of the sidewall and shaft support while raising the slip formwork.

24 Claims, 6 Drawing Sheets

(51) Int. Cl.
 *E02D 27/42* (2006.01)
 *F03D 13/25* (2016.01)
 *E02B 17/00* (2006.01)

(52) U.S. Cl.
 CPC .................. *E02B 2017/0091* (2013.01); *E02D 2250/0007* (2013.01); *E02D 2250/0023* (2013.01); *E02D 2300/002* (2013.01); *F05B 2240/912* (2013.01); *F05B 2240/95* (2013.01)

(56) References Cited

FOREIGN PATENT DOCUMENTS

| | | |
|---|---|---|
| EP | 2 930 273 A1 | 10/2015 |
| EP | 3 176 329 A1 | 6/2017 |
| JP | H 9-177085 A | 7/1997 |
| JP | H 10-30332 A | 2/1998 |
| JP | 2009-57713 A | 3/2009 |
| JP | 2017-203305 A | 11/2017 |

\* cited by examiner

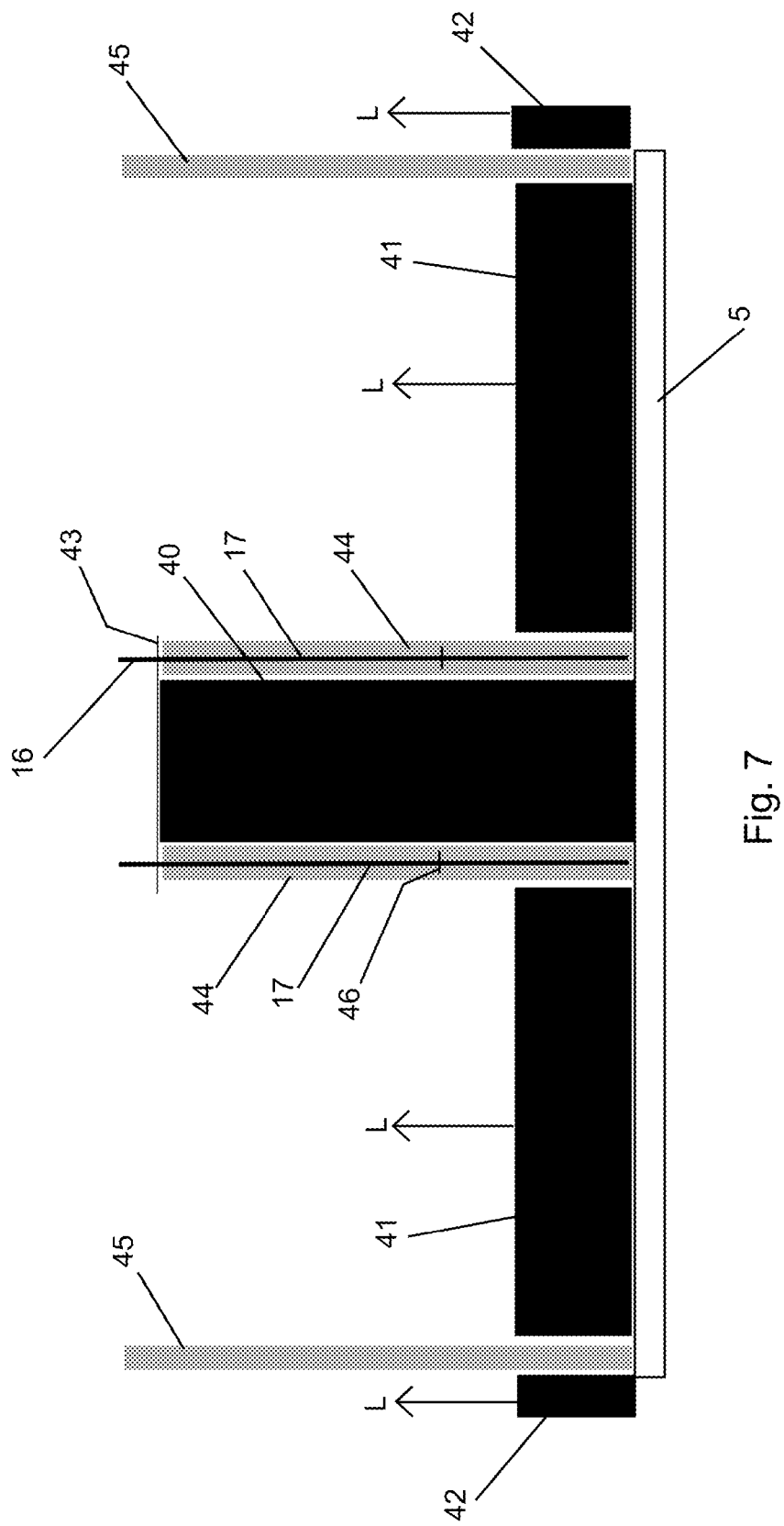

METHOD FOR MANUFACTURING A GRAVITY BASED FOUNDATION FOR AN OFFSHORE INSTALLATION, AND GRAVITY BASED FOUNDATION

CROSS-REFERENCE TO RELATED APPLICATIONS

This application is the National Stage of International Application No. PCT/NL2020/050030, filed Jan. 21, 2020, which claims the benefit of Netherlands Application No. 2022433, filed Jan. 22, 2019, the contents of which is incorporated by reference herein.

FIELD OF THE INVENTION

The present invention relates to a gravity based foundation for an offshore installation.

More specifically, the invention has been developed in relation to a gravity based mono shaft foundation for an offshore installation. But it is to be noted that the gravity based foundation according to the invention may be applied to multi shaft foundations as well.

In the context of this application a mono shaft foundation is a foundation having a single column, called in this application the shaft, to support an offshore installation on/in the sea bed. As such these columns may be piled into the sea bed, which foundations are also known as 'mono piles', whilst the column is called a pile. However, the present invention is directed to a so called gravity based foundation, which gets its stability from its mass. In general, a gravity based foundation is a foundation on the basis of a caisson, which is often produced on shore—although off shore, in shore, more general afloat or otherwise is possible as well—, is self-buoyant and towed to deeper water, is sunk down onto the seabed, and installed on the (prepared) seabed.

BACKGROUND OF PRIOR ART

With so called 'mono piles' a pile driver is used to drive the pile into the seabed with a ram acting on the upper end of the pile. As a result the upper structure, like a wind turbine, cannot be mounted directly onto the upper end of the pile. A transition piece is used. This transition piece is in fact a tube having a diameter slightly larger than the diameter of the upper end of the pile. A flange on top of the transition piece allows the upper structure to be secured using nuts and bolts. The transition piece is often mounted to the pile by means of grout. In case of wind turbines, the tower will rock and vibrate due to dynamic loads from waves and wind, which may result in crumbling of the grout. The piles are in general from concrete or steel. Steel having the advantage that it provides large strength at, relative with respect to concrete, small diameters.

An alternative for a piled foundation is a gravity based foundation. Gravity based foundations are used with wind turbines as well.

A gravity based foundation for deeper water may comprise, according to EP-1,777,348 and EP-2,559.814, a caisson of concrete as well as a shaft of concrete. Viewed in the horizontal plane, the caisson has, in general, a circular cross section. The topside of the caisson or the entire caisson has, in general, the shape of a truncated cone. The shaft extends from the top of the cone upwards, in general, to some metres above sea level. As shown in amongst others EP-1,777,348 and EP-2,559.814, the shaft does not extend inside the caisson as the lower part of the shaft ends at the top of the truncated cone. The caisson and shaft are both made from concrete. Taking into account the size of these foundations, the caisson and shaft are cast in a stepwise or sequential process, but on the end form an integral concrete structure. On top of the shaft a flange or other connection is provided for mounting the upper structure, like a wind turbine. So a transition piece can be dispensed with.

Referring to EP 2.930.273 of applicant, it is also possible to provide the shaft in the form of a hollow steel shaft. In these gravity based foundations for deeper water, the hollow steel shaft projects through an opening in the roof of the caisson and is supported with its lower part on the bottom of the caisson, whilst further support is provided by the roof. The lower part of the steel shaft is supported by a plug formed on the bottom slab and projecting into the lower part of the hollow shaft.

In general a gravity based foundation is made on shore—although off shore, in shore, more general afloat or otherwise is possible as well—and has a hollow structure to be self-buoyant so that it can be transferred to its destination in a floating condition. At its destination, water is allowed into the caisson so that it sinks down to the bottom and after arrival on the bottom the water is replaced by ballast material, such as sand, to ballast the foundation.

With fully concrete mono shaft foundations, the concrete shaft has typically a diameter in the range of 12-15 metre or even larger when applied as foundations for wind farms currently under development. These shafts with large diameter results in the water acting with high hydrodynamic load onto the shaft. According to EP 2.930.273, this high dynamic load of water acting on the shaft is limited by using steel for the shaft, which allows a considerable reduction in diameter to about half the diameter of a concrete shaft as well as a different weight distribution.

SUMMARY OF THE INVENTION

The present invention has as its object to provide a method for manufacturing a gravity based support, like the one according to EP 2.930.273 of applicant, which method allows for an alternative or improved manner of supporting the lower part of the shaft in the caisson. A further object of the invention is to provide an alternative or improved caisson.

One or more of the above objects are, according to a first aspect of the invention achieved by providing a method or methods as described herein, and are according to a second aspect achieved by providing a gravity based foundation or foundations as described herein.

According to the first aspect of the invention, there is provided a method for manufacturing a gravity based foundation for an offshore installation, wherein:

the foundation comprises a caisson of concrete and a hollow shaft, the caisson having a bottom slab, a roof and a side wall extending between the bottom slab and the roof to define a hollow structure delimited by the bottom slab, the roof and the side wall, the roof having a passage for the shaft, the shaft extending with its lower part through the passage into the caisson. According to an embodiment the hollow shaft may be made from a metal, such as steel, but may according to another embodiment also be made from another material, such as reinforced fiber. According to a further other embodiment, the hollow shaft may also be made from a composite structure comprising several materials and/or several components of similar or different materials.

the bottom slab is provided with a shaft support of concrete, the shaft support having embedded tensioning bars vertically projecting from the upper side of the shaft support. According to an embodiment, the shaft support may be a part integral with the bottom slab. The concrete shaft support being an integral part with the concrete bottom slab may be realised in a manner known from making concrete constructions, for example by attaching support rebar to slab rebar and first pouring the concrete slab and subsequently, for example after the slab has hardened, pouring the concrete shaft support.

the shaft has a flange at its lower part, the flange having bolt passages and being supported and mounted on the shaft support by means of the tensioning bars extending through the bolt passages. According to an embodiment the flange may be provided at or close to the outer end of the shaft, but according to another embodiment the shaft may also extend beyond the flange, optionally down to the bottom slab. In case of a shaft extending beyond the flange, the part of the shaft extending beyond the flange may enclose the shaft support or may be enclosed by the shaft support.

And wherein the method comprises the following steps:
providing a concrete bottom slab,
providing a full-length formwork configured for defining at least part of the shaft support and having a vertical length corresponding to the vertical length of the shaft support, and arranging the full-length formwork onto the bottom slab,
providing a slip formwork configured for defining the side wall and having a vertical height smaller than the vertical length of the full-length formwork, and arranging the slip formwork onto the bottom slab,
providing the tensioning bars and mounting the tensioning bars in a fixed position to the full-length formwork. The tensioning bars may be mounted directly or indirectly to the full-length formwork. The tensioning bars may for example be mounted to shaft support rebar, which in turn is mounted to the full-length formwork.
concrete pouring of the side wall and shaft support while raising the slip formwork.

The foundation according to the invention consists of a concrete caisson supporting a single shaft, which may be a shaft of steel. The caisson has a bottom slab, a roof wall and a side wall extending between the roof wall and bottom slab. The bottom slab, roof and side wall define a hollow structure to provide buoyancy to the caisson. Hollow does not exclude the presence of compartment walls or other structures inside the caisson. Hollow also does not exclude the structure—as normally will be the case for a foundation in use—being filled with water, sand or another fill material for ballasting so that the foundation sinks to and stays on the bottom of the water. The caisson may be self-buoyant.

Viewed in the horizontal plane, the caisson may according to the invention have a circular shape/circumference. Although the roof may according to the invention have a flat shape, the roof may according to the invention in general have a frusto conical shape.

The roof is provided with a passage for the shaft and the bottom slab is provided with a concrete shaft support to provide the shaft lateral support. The shaft support may be hollow. The shaft support has embedded tensioning bars vertically projecting from the upper side of the shaft support. The tensioning bars are placed in the shaft support in such a way that they fit through bolt passages in a flange on the lower part of the shaft, by which the shaft may be mounted on the shaft support.

In the roof, more precisely at the border of the passage in the roof, there is provided, at the upper side of the caisson, an upper support for the shaft. This upper support may be configured as described in EP 2.930.273 of applicant, but may also be configured differently. The water and wind will—depending on their directions—exert an essentially horizontal load force to the shaft, resulting in a load moment experienced by the shaft. The upper support and shaft support, in this application also called lower support, will together counteract the load forces and load moment by exerting supporting forces as well as a supporting moment on the shaft in order to withstand the load exerted by the water and wind.

As indicated already earlier, the cross section of the caisson may, according to an embodiment of the invention, have a circular shape, and the upper part of the caisson may have a frusto conical shape.

As elucidated in applicant's earlier EP 2.930.273, the loads due to wind and water acting on a gravity based foundation and the construction carried by a gravity based foundation are very high, resulting in very large forces to be transferred from the shaft to the caisson. When both the shaft and the caisson are made from concrete, this may be realized by manufacturing shaft and caisson as one integral concrete part. When the shaft is hollow and not made of concrete, a shaft support is required capable of transferring these large forces. In EP 2.930.273 this has been solved with a plug projecting from the bottom slab into the hollow shaft. However, this does not fix the shaft in vertical direction with respect to the caisson. Fixing the shaft in vertical direction with respect to the caisson is according to the invention realized by providing the shaft with a flange, which is mounted on tensioning bars projecting from the shaft support through passages, called bolt passages, formed in the flange. In order to be able to transfer the large forces from the shaft to the caisson, these tensioning bars require solid anchoring in the shaft support. This results in substantial vertical height for the shaft support being required. In order to produce the caisson economically, taking into account its height, the caisson is erected by concrete pouring the walls in a so called slip forming manner. In order to be able to attach the shaft by means of a flange to the tensioning bars, the tensioning bars require a highly accurate positioning in order to be able to insert these tensioning bars through the bolt passages. Further, highly accurate positioning of the tensioning bars with respect to the shaft support is required in order to guarantee a long lifetime, when subjected to high loads. However, slip forming does not combine with highly accurate positioning the tensioning bars because due to slip forming the tensioning bars will tend to displace. In order to realize highly accurate positioning of the tensioning bars when using slip forming, the present invention uses a full length formwork for the shaft support and mounts the tensioning bars in a fixed position relative to the full length formwork. In addition to fixing the shaft to the shaft support, the tensioning bars may also bring the shaft support under compression in order to pre-stress the concrete of the shaft support.

According to a further embodiment of the first aspect of the invention, in which embodiment the shaft support may be hollow and having an inner side and outer side, the full-length formwork defines the inner side of the shaft support, and the slip formwork is further configured for defining the outer side of the shaft support. In this embodiment the tension bars are reliably held in their position by being attached directly or indirectly to the full-length formwork, whilst the shaft support is formed by slip forming together with the side wall.

According to a further embodiment of the first aspect of the invention, the caisson may further comprise at least 2 partition walls extending from the side wall to the shaft support, wherein the slip formwork is further configured for defining the partition walls. In this embodiment each partition wall may be a part integral with the bottom slab, the side wall and the shaft support. The caisson comprises a plurality of said partition walls distributed regularly around the circumference of the shaft support, the plurality being for example three, four, five, six, seven, eight or more. In this embodiment, the partition walls may be concrete poured simultaneously with the step of concrete pouring of the side wall and shaft support, for example simultaneously with concrete pouring of the side wall and shaft support by slip forming. The partition walls assist in transferring forces from the shaft support to the slab and side walls of the caisson.

According to a further embodiment of the first aspect, the method according to the invention further comprises the steps:
  providing one or more templates with vertical template passages arranged for receiving and positioning the tensioning bars in a pattern corresponding to the pattern of the bolt passages, and
  inserting the tensioning bars through the template passages.

Using such a template may additionally increase the accuracy of the position of the tensioning bars. In case such a template is arranged on top of the shaft support (to be formed), this template may in general be removed after the shaft support has been made (allowing use of the template in manufacturing a further gravity based foundation), such a template may in this case also be left behind in the gravity based foundation. However, alternatively or additionally such a template may also be arranged elsewhere, for example at 25% and/or 50% and/or 75% of the height of the shaft support. In this latter case, the template will be a lost template left behind inside the shaft support to be formed.

According to a further embodiment of the first aspect of the invention, rebar may be used to reinforce the slab and/or shaft support and/or side wall and/or partition walls. The bottom slab may for example be provided with slab rebar, partly projecting from the slab at the locations of the side wall and/or shaft support and/or optional partition walls. The projecting parts of the slab rebar may be attached to rebar of the side wall, shaft support, and/or partition walls respectively.

According to a further embodiment of the first aspect, the method according to the invention further comprises the steps:
  providing shaft support rebar configured for reinforcing the shaft support,
  mounting the tensioning bars to the shaft support rebar, and
  optionally mounting the shaft support rebar to the slab rebar.

According to a further embodiment of the first aspect, the method according to the invention further comprises the step of fixing the template to the shaft support rebar.

According to a further embodiment of the first aspect, the method according to the invention further comprises the steps:
  providing side wall rebar configured for reinforcing the side wall, and
  optionally mounting the side wall rebar to the slab rebar.

According to a further embodiment of the first aspect, the method according to the invention further comprises the steps:
  providing partition wall rebar configured for reinforcing the partition wall,
  mounting the partition wall rebar to the side wall rebar and/or shaft support rebar, and
  optionally mounting the partition wall rebar to the slab rebar.

According to a further embodiment of the first aspect of the invention, the slip formwork is raised continuously or stepwise during concrete pouring the side wall, shaft support and optional partition walls.

According to a further embodiment of the first aspect, the method according to the invention further comprises the steps:
  providing the shaft,
  inserting the tensioning bars through the bolt passages,
  attaching the shaft to the shaft support with the tensioning bars and tensioning the tensioning bars. In the field of concrete, this tensioning is in general called post-tensioning.

According to a further embodiment of the first aspect, the method according to the invention further comprises the step:
  providing the roof,
  attaching the roof to the side wall and to the shaft.

According to a further embodiment of the first aspect, the method according to the invention further comprises the steps:
  providing a wind turbine comprising a vertical tower carrying a turbine at its upper end, and
  mounting the lower end of the tower to the upper end of the shaft.

According to a second aspect of the invention, a gravity based foundation for an offshore installation is provided, wherein the foundation comprises a caisson of concrete and a hollow shaft, the caisson having a bottom slab, a roof, a side wall extending between the bottom slab and the roof to define a hollow structure delimited by the bottom slab, and optionally partition walls extending from the side wall to the shaft support, the roof and the side wall, the roof having a passage for the shaft, the shaft extending with its lower part through the passage into the caisson; wherein the bottom slab is provided with a shaft support of concrete, the shaft support having embedded tensioning bars vertically projecting from the upper side of the shaft support, [and the shaft support preferably being a part integral with the bottom slab]; and wherein the shaft has a flange at its lower part, the flange having bolt passages and being supported and mounted on the shaft support by means of the tensioning bars extending through the bolt passages.

According to a further embodiment of the second aspect of the invention, the shaft support comprises shaft support rebar, wherein the tensioning bars are mounted to the shaft support rebar.

According to a further embodiment of the second aspect of the invention:
  the bottom slab comprises slab rebar, optionally mounted to the shaft support rebar,
  and/or
  the side wall comprises side wall rebar, optionally mounted to the slab rebar,
  and/or the partition wall comprises partition wall rebar, the partition wall rebar being optionally mounted to:
the slab rebar,
and/or
the side wall rebar,
and/or
the shaft support rebar.

According to a further embodiment of the first and/or second aspect of the invention, the vertical length of the slip formwork is smaller than the height of the side wall.

According to a further embodiment of the first and/or aspect of the invention, the foundation is self-buoyant.

According to a further embodiment of the first and/or second aspect of the invention, the shaft may be a shaft of steel.

To give some indication of dimensions of a gravity based foundation manufactured according to the first aspect or a gravity based foundation according to the second aspect, according to a further embodiment of the first and/or second aspect of the invention,
the footprint of the caisson on the bottom of the water/sea may have a diameter larger than 20 m, such as in the range of 30-60 m, like 30-40 m;
and/or
the vertical height of the shaft may be larger than 40 m, like 50-80 m or larger for water depth of 30-60 m;
and/or
the vertical height of the caisson may be larger than 15 m, such as 20 m or larger, like in the range of 15-30 m;
and/or
the shaft support may have a vertical height of 7-12 m, such as about 8.5 m;
and/or
the vertical height of the shaft support may be in the range of 80% to 120% of the vertical height of the side wall;
and/or
the shaft support may have a diameter in the range of 5-9 m, such as about 7.5 m.

According to a third aspect, the method relates to a gravity based foundation or wind energy installation obtained with the method according to the first aspect of the invention.

According to a fourth aspect of the invention, the invention relates to an offshore installation comprising i) a gravity based foundation according to the second aspect of the invention or obtained with the method according to the first aspect of the invention, and ii) a wind turbine comprising a vertical tower carrying a turbine at its upper end, wherein the lower end of the turbine is supported on the shaft of the foundation.

With respect to the present invention, it is noted that the gravity based foundation will, as is presently contemplated, be made on shore—although off shore, in shore, more general afloat or otherwise is possible as well—. Further, the gravity based foundation according to the invention has a hollow structure to be self-buoyant so that it can be transferred to its destination in a floating condition. At its destination, water is allowed into the caisson so that it sinks down to the bottom and after arrival on the bottom the water is replaced by ballast material, such as sand, to ballast the foundation. In order to improve and/or influence the stability and floating behaviour of the foundation during transportation in floating condition, water can optionally be allowed into the caisson before or during transportation. The amount of water allowed into the caisson before or during transportation may be less than the amount allowed into the caisson for sinking it down.

Throughout this application the term 'slip forming' means forming an object from—reinforced or non-reinforced—concrete by means of a slip formwork. Or in other words, 'slip forming' is a construction method in which concrete is poured into a continuously or stepwise moving formwork.

Throughout this application the term 'rebar', also known as reinforcement steel or reinforcing steel, comprises steel bar(s) and/or mesh(es) of steel wires used in reinforced concrete structures to strengthen the concrete and/or to hold the concrete in tension.

BRIEF DESCRIPTION OF THE DRAWINGS

The present invention will be further described below, with reference to the drawings. In these drawings:

FIG. 7 illustrates highly schematically the method according to the invention.

DETAILED DESCRIPTION OF THE INVENTION

Figure 1:
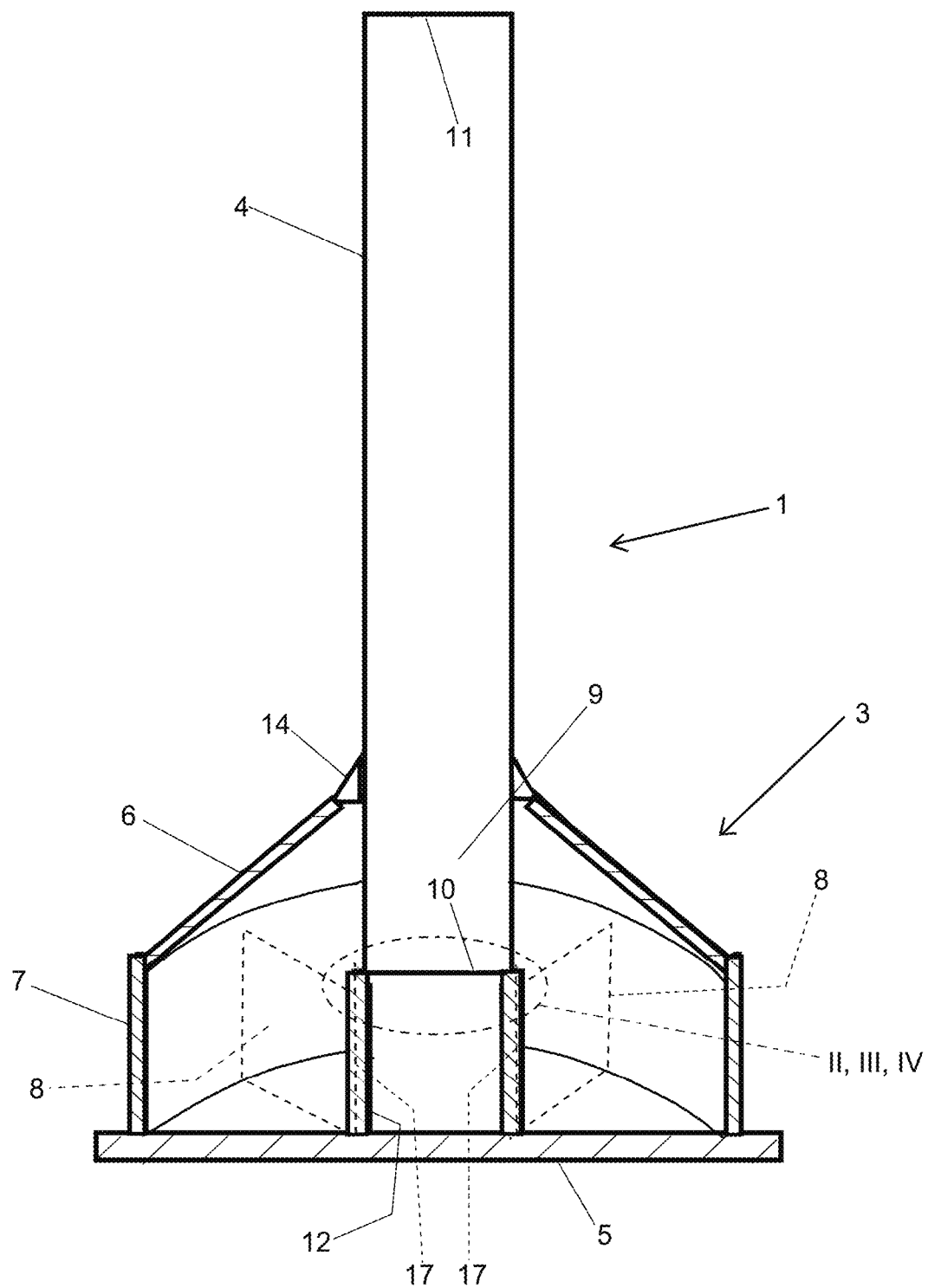
FIG. 1 shows, in a highly schematic cross-section, a gravity based foundation according to the invention and obtained with the method according to the invention.

FIG. 1 shows a cross section of a gravity based foundation 1 according to the invention. The foundation 1 shown consists of a caisson 3 and a shaft 4. The foundation 1 has been made on shore, although off shore, in shore, more general afloat or otherwise is possible as well. The caisson 3 and shaft 4 assembled together into a unit can be brought to its destination off shore over water. Due to their hollow structure, the assembly of caisson 3 and shaft 4 is self-buoyant and can be towed to its destination offshore by tugs or other vessels. Arrived at its destination, water is allowed to enter the caisson 3, so that the caisson 3 and shaft 4 sink to the sea bed. The upper end 11 of the shaft 4 may remain projecting above the sea level. Subsequently the water inside the caisson 3 and in general also the water inside the shaft 4 is replaced by a ballast mass, like sand. For clarity reasons, the sand inside the caisson 3 and shaft 4 has not been shown.

Figure 6:
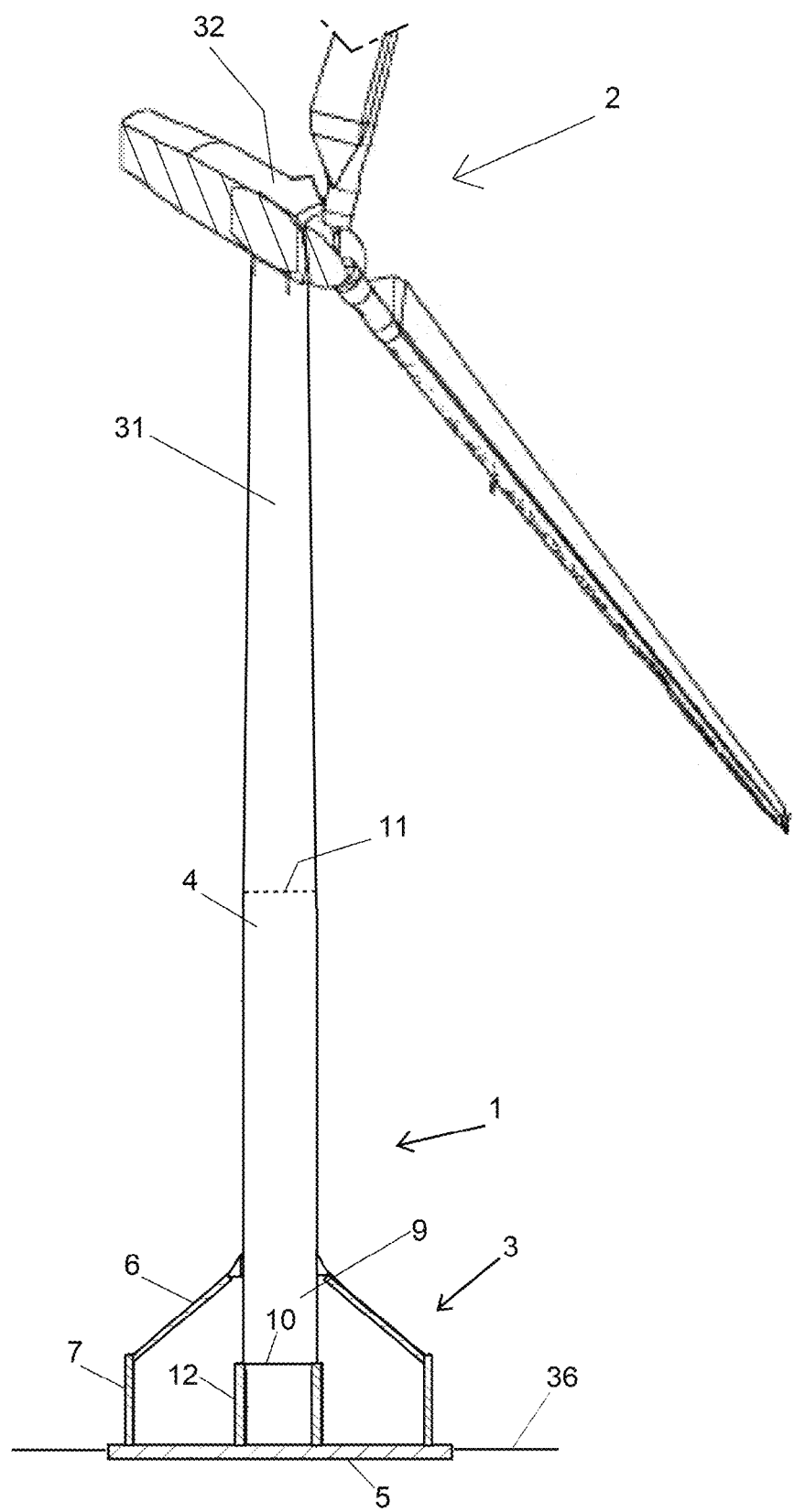
FIG. 6 shows, in a highly schematic cross-section and partly perspective view, a wind energy installation according to the invention and obtained with the method according to the invention.

Referring to FIG. 6, after installing the foundation 1 at its position on the sea bed 36, an off shore installation 2 has been installed on the upper end 11 of the shaft 4. In the embodiment shown, the off shore installation is a wind turbine of a wind farm. The wind turbine has a so called tower 31 carrying the turbine 32.

As can be seen in FIG. 1, the caisson is defined by a bottom slab 5, a roof 6, and a side wall 7 extending between the bottom slab 5 and roof 6. Although the roof 6 may have any shape, like a flat wall extending horizontally, it is preferred that the roof 6 is tapering in upward direction towards the shaft 4. In the embodiment shown, the roof 6 has a frusto conical shape. The caisson may, and in general will, have partition wall 8, shown in FIG. 1 schematically in dashed lines.

The caisson as a whole may be made of concrete. Taking into account that the bottom slab 5 of the caisson may have a diameter of 30-40 m and that the vertical height of the caisson 3 may be about 20 m, it is clear that such a concrete caisson will in general be made stepwise or sequentially. The bottom slab 5 will be made first. Subsequently the side wall 7 and partition wall are made by casting from concrete them on site onto the bottom slab 5 in a slip forming manner. As a next step the roof 6 may be casted from concrete on site or assembled from prefabricated roof elements, which are placed on the side wall 7 and joined by casting concrete in the gaps at the connections between adjacent roof elements. In similar manner, the roof 6 or roof elements are attached to the side wall 7 by casting concrete at the connections between roof 6 and side wall 7. The slab 5, side wall 5, partition walls 8 and roof 6 may comprise slab rebar to reinforce the concrete casting. By joining the slab rebar with the side wall rebar, with the partition wall rebar, and with the shaft support rebar, a concrete element formed as an integral part is obtained. In similar manner the roof 6 may become an integral part with the side wall 7 by joining the side wall rebar with the roof rebar.

The upper support 14 is arranged at the transition between the concrete roof 6 and the steel shaft 4. The concrete roof 6 is provided with a passage for the shaft 4. As during assembly, the shaft 4 is added to the foundation after making the caisson 3, the passage in the roof may be wider than the diameter of the (lower part 9 of the) shaft 4 requires. At this stage the passage is defined by a border formed by the concrete of the roof 6. In a later stage, this space remaining between the roof 6 and shaft 4 may be filled or bridged with concrete as well. By way of example, reference is made to applicant's earlier EP 2.930.273 which shows how the roof may be attached to the shaft. Other manners of attaching the roof to the shaft may be used as well.

The lower support or shaft support 12 is arranged on the bottom slab, and is shown in FIG. 1 as a hollow structure, although it is not necessarily hollow. The lower part 9 of shaft 4 is supported by the shaft support 12. There, the shaft 4 and shaft support 12 can be tightened together.

Figure 2:
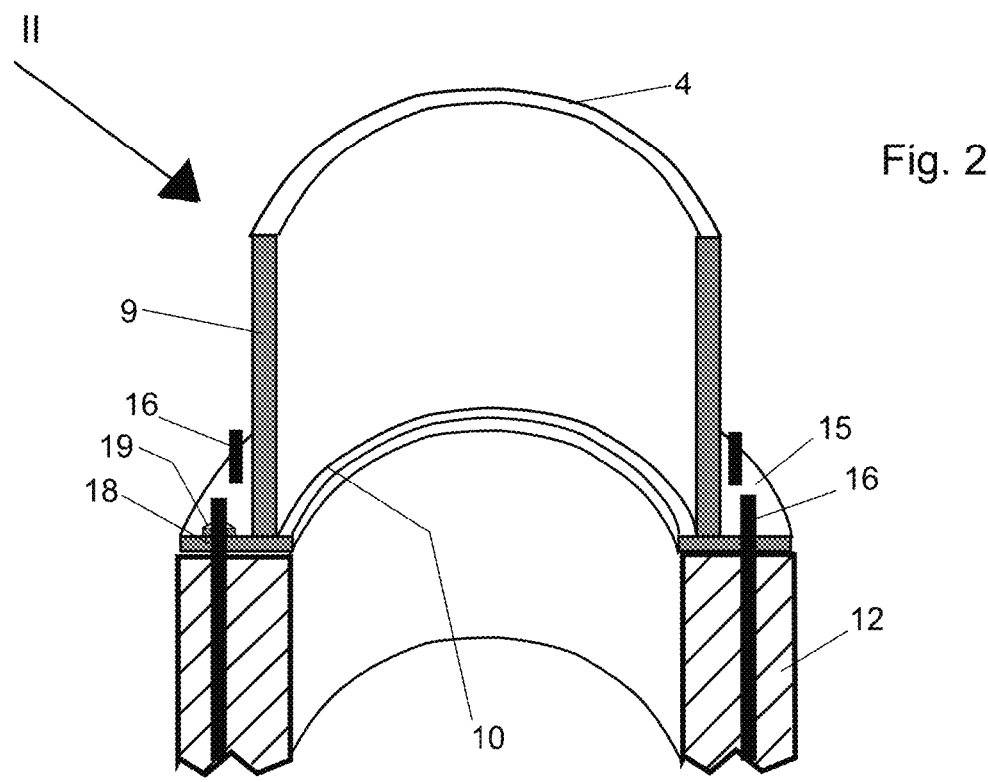
FIG. 2 shows, as a detail of FIG. 1, in highly schematic cross-section details of a first embodiment of a gravity based foundation according to the invention and obtained with the method according to the invention.
Figure 3:
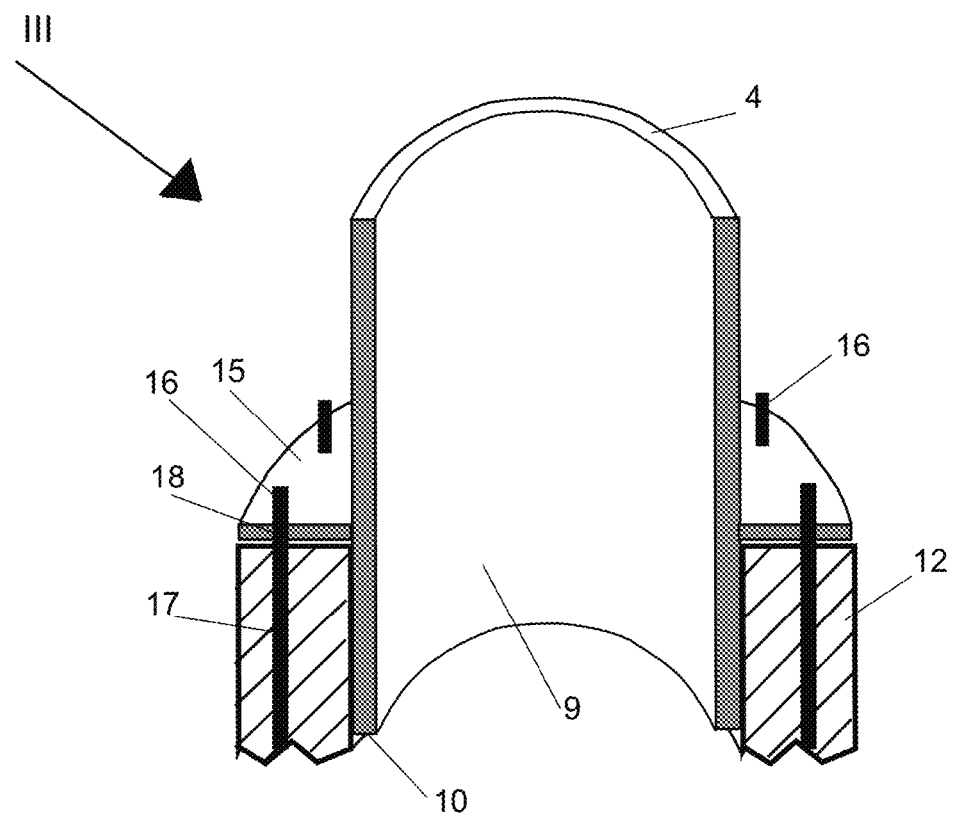
FIG. 3 shows, as a detail of FIG. 1, in highly schematic cross-section details of a second embodiment of a gravity based foundation according to the invention and obtained with the method according to the invention.
Figure 4:
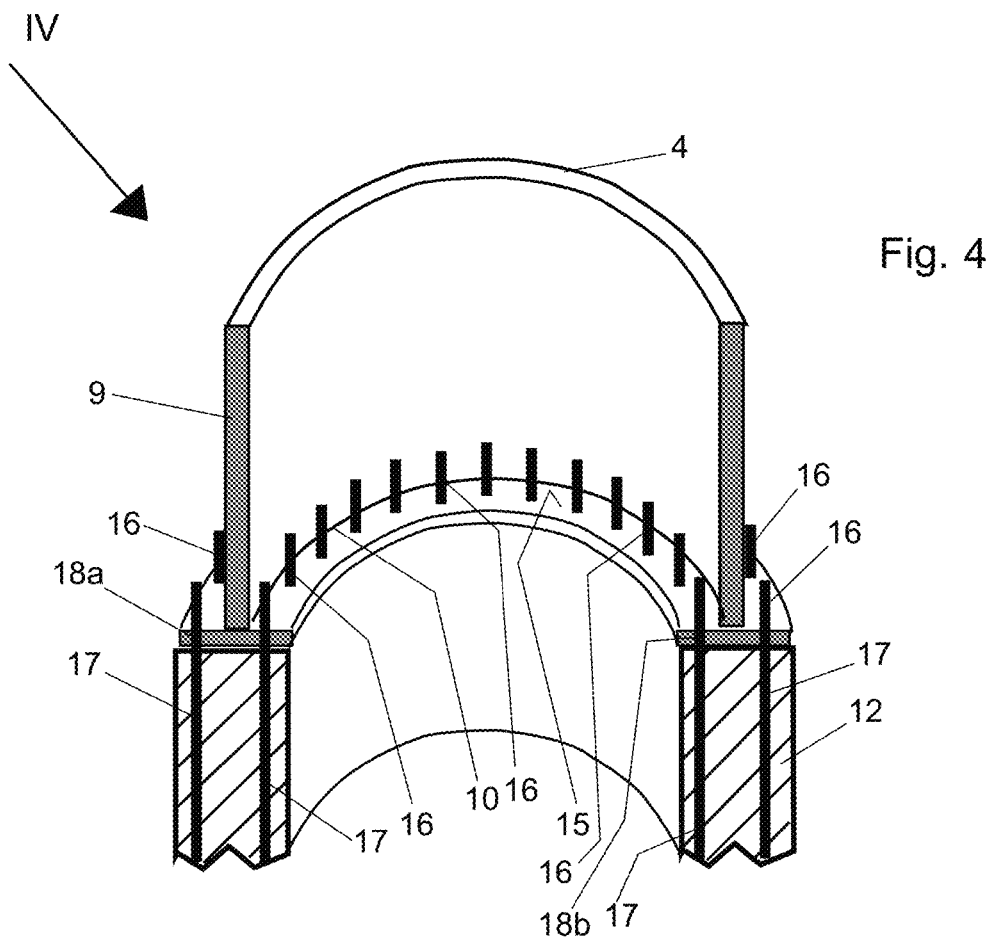
FIG. 4 shows, as a detail of FIG. 1, in highly schematic cross-section details of a third embodiment of a gravity based foundation according to the invention and obtained with the method according to the invention.

By way of example, FIGS. 2, 3 and 4 show a detail of a first manner, a second manner and a third manner, respectively, of mounting the shaft 4 with its lower part to the shaft support 12. The part of FIG. 1 shown in detail in FIGS. 2, 3 and 4, respectively, has been indicated in FIG. 1 with the reference II, III, IV.

Referring to FIG. 2, the lower part 9 of the shaft 4 is provided with a flange 15 at the lower outer end of the shaft 4. In case of a steel shaft 4, the flange may be a steel flange welded to the shaft 4. The flange 15 has a plurality of bolt passages 18 distributed around the outer circumference of the shaft 4. The shaft support 12 is provided with a corresponding plurality of tensioning bars 17. These tensioning bars 17 are embedded in the concrete of the shaft support and have upper end parts 16 which vertically project from the shaft support 12. These vertically projecting end parts 16 extend through the bolt passages 18. The vertically projecting end parts 16 are provided with mounting features configured to allow the tensioning bars to be post-tensioned for firmly securing the shaft 4 to the shaft support 12 after the shaft support has been made. In general, per vertically projecting part 16, each mounting feature may comprise a first mounting element, like a rod (in the form of the vertically projecting part) with external screw thread, and a second mounting element 19 (only one shown in FIG. 2) configured for cooperation with the first mounting element, like a nut with mating internal screw thread. By way of example, the vertically projecting parts 16 of the tension bars 17 may be provided with external screw thread and nuts with a mating internal screw thread may be screwed on the projecting parts 16. However, other mounting features are conceivable as well.

The second embodiment of FIG. 3 differs from the first embodiment of FIG. 2 in that the flange 15 is arranged at a distance from the lower outer end 10 of the shaft. Like in the first embodiment of FIG. 2, the vertically projecting end parts 16 are provided with mounting features configured to allow the tensioning bars to be post-tensioned for firmly securing the shaft 4 to the shaft support 12 after the shaft support has been made. In general, per vertically projecting part 16, each mounting feature may comprise a first mounting element, like a rod (in the form of the vertically projecting part) with external screw thread, and a second mounting element 19 (not shown in FIG. 3) configured for cooperation with the first mounting element, like a nut with mating internal screw thread. By way of example, the vertically projecting parts 16 of the tension bars 17 may be provided with external screw thread and nuts with a mating internal screw thread may be screwed on the projecting parts 16. However, also in relation to the second embodiment, other mounting features are conceivable as well. Concerning further constructional details, the second embodiment according to FIG. 3 may be essentially the same as the first embodiment according to FIG. 2.

Also in the second embodiment of FIG. 3, the lower part 9 of the shaft 4 is provided with a flange 15. However, in the case of the FIG. 3 embodiment, the flange 15 is—as already said above—arranged at a distance from the lower outer end 10 of the shaft. In case of a steel shaft 4, the flange may be a steel flange welded to the shaft 4. The lower outer end 10 of the shaft 4 thus extends through the flange 15, or in other words, viewed from above in downward direction, the lower part 9 of the shaft 4 extends beyond the flange 15. In the embodiment shown in FIG. 3, the lower outer end 10 of the shaft 4 lies at a distance from the slab 5 (not shown in FIG. 3). The lower outer end 10 may for example lie at about half way the vertical distance from the flange 15 to the slab 7. According to another embodiment, the lower part 9 of the shaft 4 may extend down to the slab 5, in which case the lower outer end 10 may contact the slab 5.

In the second embodiment of FIG. 3, the outer diameter of the lower part 9 of the shaft 4 may be about the same as the inner diameter of the shaft support so that a mechanically closed retaining is achieved. In case the outer diameter of the lower part of the shaft is smaller than the inner diameter of the shaft support, a mechanically closed retaining may also be achieved by filling the inner space between shaft and shaft support with for example concrete or grout.

The third embodiment of FIG. 4 differs from the first embodiment of FIG. 2 in that in the third embodiment the flange 15 has a first plurality of bolt passages 18a distributed along the outer circumference of the lower part 9 of the shaft 4 and a second plurality of bolt passages 18b distributed along the inner circumference of the lower part 9 of the shaft. Correspondingly, there are also two pluralities of tensioning bars 17 embedded in the concrete of the shaft 4, each tensioning bar 17 having an upper end part 16 which vertically projects from the shaft support 12. Like in the embodiment of FIG. 2, the vertically projecting end parts 16 are each provided with mounting features configured to allow the tensioning bars to be post-tensioned for firmly securing the shaft 4 to the shaft support 12 after this shaft support has been formed. In general, per vertically projecting part 16, each mounting feature may comprise a first mounting element, like a rod (in the form of the vertically projecting part) with external screw thread, and a second mounting element 19 (not shown in FIG. 4) configured for cooperation with the first mounting element, like a nut with mating internal screw thread. By way of example, the vertically projecting parts 16 of the tension bars 17 may be provided with external screw thread and nuts with a mating internal screw thread may be screwed on the projecting parts 16. However, also in relation to the third embodiment, other mounting features are conceivable as well. Concerning further constructional details, the third embodiment according to FIG. 4 may be essentially the same as the first embodiment according to FIG. 2 (or where applicable the second embodiment according to FIG. 3).

Referring to FIG. 1, the tensioning bars 17—like the tensioning bars 17 of the FIGS. 2, 3 and 4—may extend down to the slab 5 or may even extend into the slab 5. Further, at the lower ends of the tensioning bars 17—like the tensioning bars 17 of the FIGS. 2, 3 and 4—anchoring elements may be provided. Such an anchoring element may be a plate extending transvers to the respective tensioning bar 17 and securely attached to the respective tensioning bar. These anchoring elements serve the purpose to keep the tensioning bar 17 in place when it is post-tensioned—i.e. tensioned after hardening of the concrete—when mounting the shaft 4. In order to facilitate post-tensioning of the tensioning bars 17, each tensioning bar—like the tensioning bars 17 of the FIGS. 2, 3 and 4—may be arranged in a tube preventing the tensioning bar 17 from direct contact with the concrete.

Figure 5:
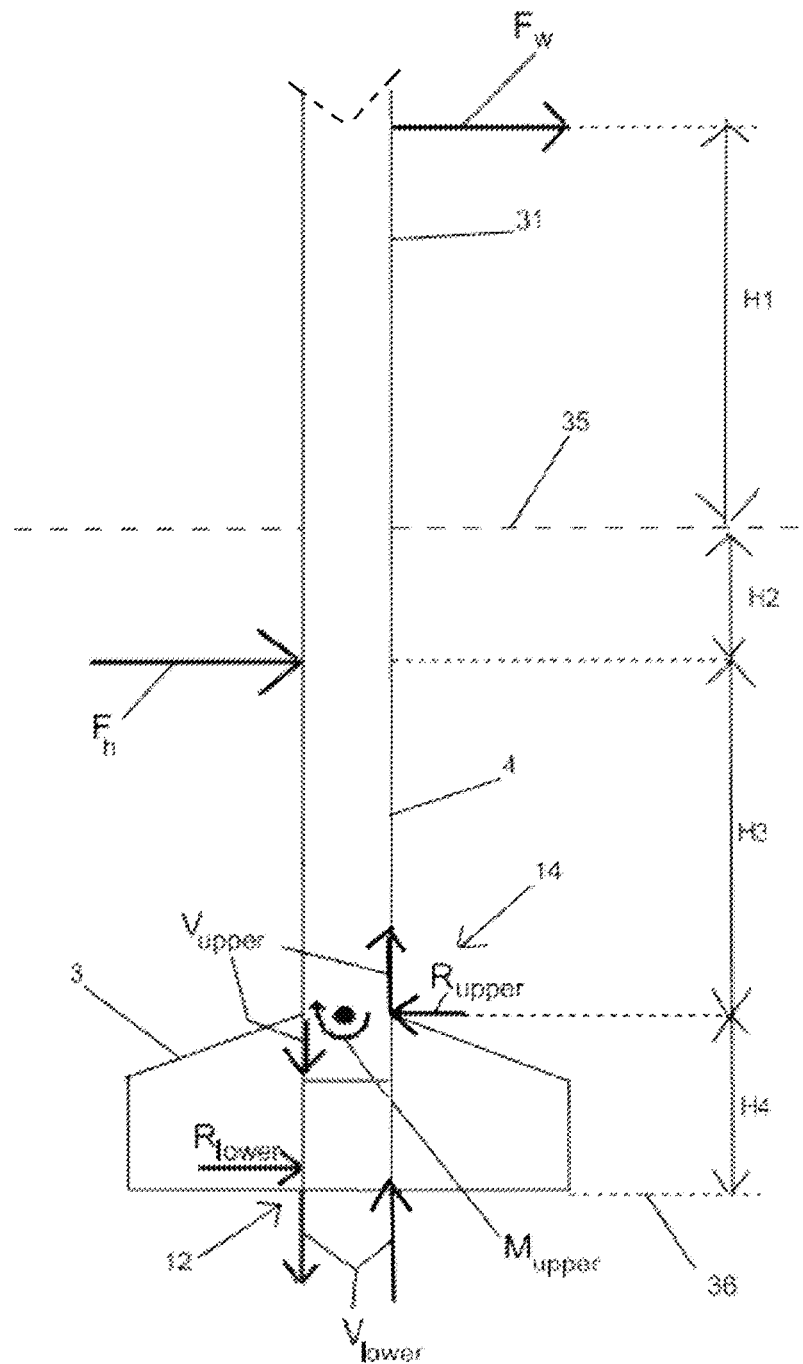
FIG. 5 illustrates, by way of example and highly schematically, a representation of forces acting on the shaft of a gravity based foundation according to the invention.

FIG. 5 shows schematically, on high level and without being complete an example of loads acting on and in a foundation and wind turbine 31 according to the invention. The wind acting on the wind turbine is represented by arrow Fw and assumed to act at an height H1 of about 100 m above the sea level 35. Forces due to wind may reach high values, Fw may for example have a force of 2 MN (MN=mega Newton). The water acting on the shaft 4 is represented by arrow Fh and assumed to act at a height H2 of about 10 m below the sea level 35. Forces due to the water (like due to waves, tides, flows etcetera) may reach high values as well, Fh may for example have a force of 3 MN (MN=mega Newton). The sea bed 36 is in this example at a depth (H2+H3+H4) of 50 m, whilst the height H4 of the caisson—i.e. the height of the level of the upper support—is 20 m, so that Fh is assumed to act at H3 is 20 m above the upper support 14. The diameter of the shaft 4 at the level of the lower support 12 and upper support 14 is in this example about 7 m (7 metre).

These wind and water loads Fw, Fh result in reaction forces and reaction moments between the shaft 4 and caisson 3 at the locations where the shaft is supported by the caisson. These locations are the upper support 14 and lower support 12.

The connection at the lower support between the shaft 4 and slab 5 via the plug shaft support 12 can be regarded as a so called 'fixed beam connection'. Due to the wind and water load, the shaft support will, at the level of the lower support, exert onto the shaft at least a horizontal reaction force Rlower, a vertical reaction force Vlower, and a reaction moment (not shown) having a horizontal axis. Other reaction forces and reaction moments may be present as well.

Also the connection at the upper support 14 between the shaft 4 and the roof 3 can be regarded as a so called 'fixed beam connection'. Due to the wind and water load, the roof/upper support will, at the level of the upper support, exert onto the shaft at least a horizontal reaction force Rupper, vertical reaction forces Vupper, and a reaction moment Mupper having a horizontal axis 34. Other reaction forces and reaction moments may be present as well.

As will be clear from the above, the forces acting make heavy demands on the connection between the flange and the shaft support. The tension bars have to be accurately positioned in the concrete and post-tensioned. The larger the vertical height of the shaft support the better. Additionally, the shaft support may by supported in horizontal direction by the partition wall, which also asks for a larger vertical height of the shaft support.

FIG. 7 elucidates on a highly schematic level the method according to the invention. First a concrete bottom slab 5 is provided. This bottom slab may be manufactured at a location far remote from where the other steps of the method take place. In order to reduce for example transportation costs, the bottom slab 5 may be manufactured in a station next to the station or stations where the further steps of the method according to the invention take place.

In a next preparation step/in next preparation steps there is provided:
- a full-length formwork 40 configured to define the inner side of the shaft support and placed onto the slab 5;
- a slip formwork 41, 42 configured to define the side wall, partition wall and outer side of the shaft support and placed onto the slab 5;
- tensioning bars 17 are placed in position and accurately mounted to the full length formwork 40 so that its position is fixed relative to the full length formwork 40;
- optionally, a (retrievable) template 43 is placed on top of the full length formwork 40 and is securely mounted to the full length formwork 40 so that its position is fixed relative to the full length formwork 40;
- optionally, one or more lost templates 46 may be arranged along the height of the full length formwork and securely mounted to the full length formwork 40 so that its position(s) is(/are) fixed relative to the full length formwork 40;
- optionally, shaft support rebar 44 and/or side wall rebar 45 and/or partition wall rebar is placed and attached to projecting parts of slab rebar.

After finishing the preparation steps, concrete pouring of the side wall, shaft support and partition wall can be started. Concrete is poured into the spaces delimited between the slip formwork 41, 42 and the full-length formwork 40. In case of stepwise slip forming the slip formwork 41, 42 is raised in steps as indicated with arrows L in order to manufacture subsequent sections of the side wall, shaft support and partition walls on top of each other. In case of continuous slip forming, the slip formwork 41*m* 42 is raised continuously, simultaneously with pouring concrete into the spaces delimited between the slip formwork 41, 42 and the full-length formwork 40.

The invention claimed is:

1. A method for manufacturing a gravity based foundation for an offshore installation,
   wherein the foundation comprises a caisson of concrete and a hollow shaft, the caisson having a bottom slab, a roof and a side wall extending between the bottom slab and the roof to define a hollow structure delimited by the bottom slab, the roof and the side wall, the roof having a passage for the shaft, the shaft extending with a lower part of the shaft through the passage into the caisson;
wherein the bottom slab is provided with a shaft support of concrete,
wherein the shaft support is a hollow tubular member having an inner side, an outer side, and a tubular wall therein-between, the shaft support having tensioning bars having upper portions and lower portions, the lower portions of the tensioning bars being embedded in the tubular wall of the shaft support and the upper portions of the tensioning bars vertically projecting from an upper side of the tubular wall of the shaft support;
wherein the shaft has a flange at the lower part of the shaft, the flange having bolt passages and being supported and mounted on the shaft support by means of the tensioning bars extending through the bolt passages;
the method comprising the following steps:
providing the concrete bottom slab,
providing a full-length formwork configured for defining the inner side of the shaft support and having a vertical length corresponding to the vertical length of the shaft support, and arranging the full-length formwork onto the bottom slab,
providing a slip formwork configured for defining the side wall and the outer side of the shaft support, the slip formwork having a vertical height smaller than the vertical length of the full-length formwork, and arranging the slip formwork onto the bottom slab,
providing the tensioning bars and mounting the tensioning bars, in a fixed position, to the full-length formwork, and
concrete pouring of the side wall and shaft support by pouring concrete into the spaces delimited between the slip formwork and the full-length formwork while raising the slip formwork.

2. The method according to claim 1,
wherein the caisson further comprises at least 3 partition walls extending from the side wall to the shaft support, and wherein the slip formwork is further configured for defining the partition walls.

3. The method according to claim 2,
wherein the caisson comprises a plurality of said partition walls distributed regularly around a circumference of the shaft support, the plurality being three, four, five, six, seven, eight or more.

4. The method according to claim 2,
wherein the partition walls are concrete poured simultaneously with the step of concrete pouring of the side wall and the shaft support.

5. The method according to claim 2, wherein each partition wall is a part integral with the bottom slab, the side wall and the shaft support.

6. The method according to claim 1,
wherein the method further comprises the steps:
providing a template with vertical template passages arranged for receiving and positioning the tensioning bars in a pattern corresponding to a pattern of the bolt passages, and
inserting the tensioning bars through the template passages.

7. The method according to claim 6,
wherein the method further comprises the steps:
providing shaft support rebar configured for reinforcing the tubular wall of the shaft support, and
mounting the lower portions of the tensioning bars to the shaft support rebar.

8. The method according to claim 7,
wherein the method further comprises the step of fixing the template to the shaft support rebar.

9. The method according to claim 1,
wherein the bottom slab is provided with slab rebar, partly projecting from the slab at locations of the side wall and the shaft support.

10. The method according to claim 1,
wherein the method further comprises the step:
providing side wall rebar configured for reinforcing the side wall.

11. The method according to claim 10,
wherein the method further comprises the steps:
providing partition wall rebar configured for reinforcing the partition wall, and
mounting the partition wall rebar to the side wall rebar and/or shaft support rebar.

12. The method according to claim 1,
wherein the slip formwork is raised continuously or stepwise during concrete pouring the side wall and the shaft support.

13. The method according to claim 1,
wherein the vertical length of the slip formwork is smaller than the height of the side wall.

14. The method according to claim 1,
wherein the method further comprises the steps:
providing the shaft,
inserting the tensioning bars through the bolt passages,
attaching the shaft to the shaft support with the tensioning bars and tensioning the tensioning bars.

15. The method according to claim 1,
wherein the method further comprises the steps:
providing the roof,
attaching the roof to the side wall and to the shaft.

16. The method according to claim 1,
wherein the foundation is self-buoyant.

17. The method for manufacturing an offshore wind energy installation, comprising the method according to claim 1, further comprising the steps:
providing a wind turbine comprising a vertical tower carrying a turbine at an upper end of the vertical tower, and
mounting the lower end of the vertical tower to an upper end of the shaft.

18. A wind energy installation obtained with the method according to claim 17.

19. A gravity based foundation, obtained with the method according to claim 1.

20. A gravity based foundation for an offshore installation, wherein the foundation comprises a caisson of concrete and a hollow shaft, the caisson having a bottom slab, a roof, a side wall extending between the bottom slab and the roof to define a hollow structure delimited by the bottom slab, the roof and the side wall, the roof having a passage for the shaft, the shaft extending with a lower part of the shaft through the passage into the caisson;
wherein the bottom slab is provided with a shaft support of concrete,
wherein the shaft support is a hollow tubular member having an inner side, an outer side, and a tubular wall therein-between, the shaft support having tensioning bars having upper portions and lower portions, the lower portions of the tensioning bars being embedded in the tubular wall of the shaft support and the upper portions of the tensioning bars vertically projecting from an upper side of the tubular wall of the shaft support, and the shaft support being a part integral with the bottom slab;

and wherein the shaft has a flange at the lower part of the shaft, the flange having bolt passages and being supported and mounted on the shaft support by means of the tensioning bars extending through the bolt passages.

21. The foundation according to claim 20, wherein the shaft support comprises shaft support rebar, and wherein the lower portions of the tensioning bars are mounted to the shaft support rebar.

22. The foundation according to claim 20, wherein the bottom slab comprises slab rebar mounted to the shaft support rebar, and the side wall comprises side wall rebar mounted to the slab rebar, and the partition wall comprises partition wall rebar, the partition wall rebar being mounted to:

the side wall rebar and the shaft support rebar.

23. The foundation according to claim 20, wherein the foundation is self-buoyant.

24. An offshore installation, comprising a foundation according to claim 20 and a wind turbine, the wind turbine comprising a vertical tower carrying a turbine at an upper end of the tower, wherein a lower part of the tower is supported on the shaft of the foundation.

* * * * *